US008456280B2

(12) United States Patent
Layer et al.

(10) Patent No.: US 8,456,280 B2
(45) Date of Patent: Jun. 4, 2013

(54) PRODUCT CARRIER AND SYSTEM MADE UP OF PRODUCT CARRIER AND RECEIVER UNIT

(75) Inventors: Hans Layer, Ulm (DE); Martin Werner, Singen (DE)

(73) Assignee: Alcan Technology & Management Ltd., Neuhausen Am Rheinfall (CH)

( * ) Notice: Subject to any disclaimer, the term of this patent is extended or adjusted under 35 U.S.C. 154(b) by 708 days.

(21) Appl. No.: 12/665,987

(22) PCT Filed: Jun. 12, 2008

(86) PCT No.: PCT/EP2008/004711
§ 371 (c)(1), (2), (4) Date: Dec. 22, 2009

(87) PCT Pub. No.: WO2009/000426
PCT Pub. Date: Dec. 31, 2008

(65) Prior Publication Data

US 2010/0187243 A1 Jul. 29, 2010

(30) Foreign Application Priority Data

Jun. 25, 2007 (EP) .................................... 07012416

(51) Int. Cl.
*H04Q 5/22* (2006.01)

(52) U.S. Cl.
USPC ........................................................ 340/10.1

(58) Field of Classification Search
USPC ........................... 340/10.1, 505, 541; 73/290
See application file for complete search history.

(56) References Cited

U.S. PATENT DOCUMENTS

| | | | | |
|---|---|---|---|---|
| 7,219,545 | B2 * | 5/2007 | Salzmann et al. | 73/304 R |
| 7,458,260 | B2 * | 12/2008 | Roesner | 73/290 V |
| 2008/0135446 | A1 | 6/2008 | Pohl | |

FOREIGN PATENT DOCUMENTS

| | | | |
|---|---|---|---|
| WO | 03055769 | A | 7/2003 |
| WO | 2006007867 | A | 1/2006 |

OTHER PUBLICATIONS

International Search Report dated Oct. 17, 2008 (PCT/EP2008/004711); ISA/EP.

* cited by examiner

*Primary Examiner* — Vernal Brown
(74) *Attorney, Agent, or Firm* — Harness, Dickey & Pierce, P.L.C.

(57) ABSTRACT

The invention relates to a product carrier comprising a first packaging unit wherein when opened a first switch of an integrated circuit of the product carrier is opened and at least one second packaging unit wherein when opened a second switch of the integrated circuit is opened. The circuit is configured and/or arranged to cooperate with electronic means so that a value correlating with the degree of filling of the product carrier can be determined on the basis of the number of closed and/or opened switches. Further, an antenna cooperates with the electronic means to transmit said value, the electric power for the electronic means may be introduced without contact, and the first and the second switch are connected in parallel.

32 Claims, 4 Drawing Sheets

PRODUCT CARRIER AND SYSTEM MADE UP OF PRODUCT CARRIER AND RECEIVER UNIT

Figure 1:
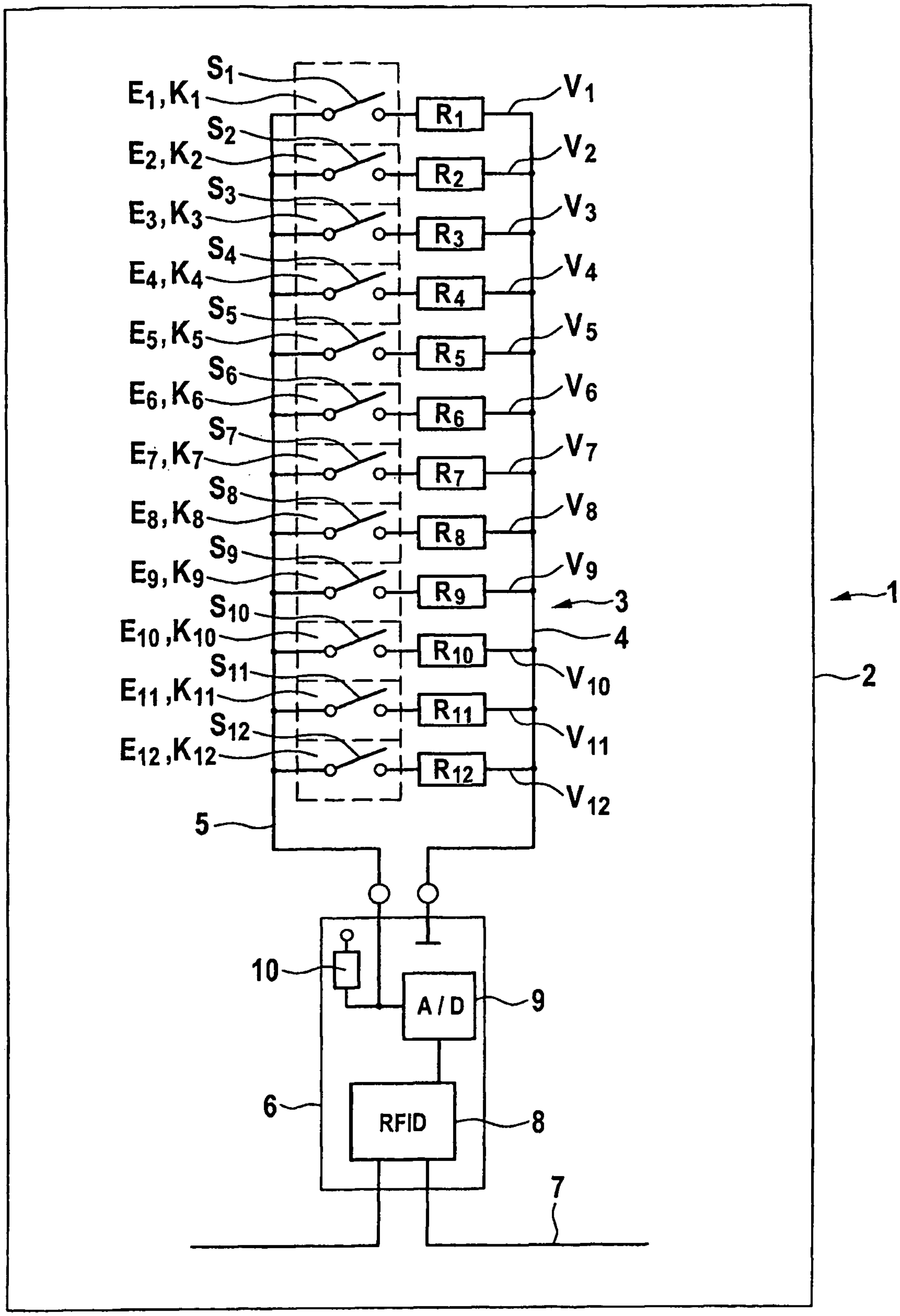

The invention relates to a product carrier with a first packaging unit, on the opening of which a first switch of an integrated circuit of the product carrier is opened and with at least one second packaging unit, on the opening of which a second switch of the integrated circuit is opened. In this case, the circuit is configured and/or arranged to cooperate with electronic means, by means of which a value correlating with the degree of filling of the product carrier can be determined on the basis of the number of closed and/or opened switches, it being possible to transmit said value by means of an antenna cooperating with the electronic means, wherein the electric power for the electronic means may be introduced without contact. Furthermore, the invention relates to a system of a product carrier and a receiver unit for receiving the value correlating with the degree of filling of the product carrier.

Blister or press-through packagings are known on the market as product carriers, in which medicines such as pills, coated tablets or ampoules are packaged. There is a need to be able to read the number or, in the case of liquids and powders, the quantity of products still packaged in the product carrier or already removed therefrom in order to be able to use this information suitably, for example to remind the user to remove a product or to inform the user about the number or quantity of the goods still available, etc.

The invention is therefore based on the object of proposing a product carrier in which it is suitable to read therefrom, with simple means, the number or the quantity of the products still available and/or already removed, i.e. the degree of filling. Furthermore, the object consists in proposing a system, by means of which information on the degree of filling can be read from the product carrier and optionally further processed and/or stored.

This object is achieved with regard to the product carrier described at the outset in that the first and the second switches are connected in parallel.

With regard to the system, the object is achieved with a product carrier according to the invention in combination with a suitable receiver unit for receiving the value correlating with the degree of filling of the product carrier.

The invention is based on the idea of associating a circuit with the product carrier, i.e. to integrate it therein, preferably in that the circuit is applied to the product carrier or is introduced therein. In this case, the packaging units themselves may in each case form a switch or a component of a switch and therefore be a direct part of the circuit, or else a switch, which is part of the circuit, is associated with the packaging units in each case. In the preferred, simplest case, the switches are formed, in each case, by a circuit board conductor, which is interrupted on opening the packaging unit associated therewith, in other words, for example, on pressing through a cover film of a product carrier configured as a blister packaging, wherein, by interrupting the circuit board conductor, the switch formed thereby is opened and therefore the current flow through this circuit board conductor is interrupted. The essential core idea of the invention is to connect the switches, in other words, in particular, the circuit board conductors in each case forming a switch in parallel so that the circuit only has to have a few, in particular only one or two, connections to electronic means, which are configured in such a that, with them, the number of closed and/or opened switches or a value correlating therewith, and therefore the number or quantity of still remaining or already removed products can be determined. A value which correlates with the degree of filling of the product carrier and is determined by the electronic means is transmitted by means of an antenna cooperating with the electronic means, the electric power to supply the electronic means and the circuit, i.e. for operating the electronic means and the circuit, according to the invention, not coming from a battery arranged on the product carrier, but it being possible to introduce this electric power required without contact, in particular inductively and/or capacitively and/or electromagnetically.

In a broadest scope of protection, the invention merely comprises the product carrier with its packaging units and with the circuit, in which the switches formed by the packaging units or associated therewith are connected in parallel. The electronic means and/or the antenna may (at least partially) be configured as a separate component/components from the product carrier and be connectable to the product carrier in a suitable manner. It is conceivable, for example, for the end user to glue the electronic means and/or the antenna to the product carrier, latch it or fasten it in another manner thereto, in particular detachably. In this manner, the electronic means and/or the antenna can be used for other product carriers. A design of the product carrier in which the latter, in addition to the packaging units and the circuit, is already configured (at the factory) with the electronic means and the antenna is preferred, so the product carrier can immediately be used as intended without additional steps by the end user being necessary. In this case, it is conceivable to print the electronic means on the product carrier, or to integrate them between two layers, in particular film layers of the product carrier. According to a first preferred embodiment, the product carrier already comprises (at the factory) the packaging units and the circuit as well as the antenna, it being possible to connect the electronic means configured in particular as a microchip or comprising a microchip in a suitable manner to the circuit and the antenna, for example to glue or latch them.

Advantageous developments of the invention are disclosed in the sub-claims. All the combinations of at least two features disclosed in the description, the claims and/or the figures also fall within the scope of the invention.

As mentioned at the outset, an embodiment is preferred in which the electronic means are rigidly, in particular non-detachably, arranged on the product carrier, wherein the power for operating the electronic means may be introduced without contact, in particular by means of suitable energy receiving means. This embodiment has the advantage that the end customer does not have to fix the electronic means, which in particular have evaluation means for determining the number of opened and/or closed switches or a value correlating therewith as well as transmission means for cooperation with an antenna, to the product carrier prior to the proper use of the product carrier.

Although it is within the scope of the invention that the antenna associated with the electronic means is also not rigidly arranged directly on the product carrier, but can be fixed thereon and can be contacted by the electronic means, an embodiment is, however, preferred in which the product carrier is already directly equipped with an antenna for transmitting the value correlating with the degree of filling, wherein the antenna may, for example, be printed on the product carrier and/or may be slotted into a metal foil of the product carrier. The electronic means are preferably configured in such a way that they are configured for transmitting the value correlating with the degree of filling in the NFC protocol (near field communication protocol).

In a development of the invention, it is advantageously provided that the antenna is configured as a slot antenna, which is slotted, for example, in a metal foil of the product carrier, or is configured as a coil antenna, which is preferably arranged on a non-electrically conductive portion of the product carrier. A slot antenna is suitable, in particular, for UHF operation, in particular at 886 MHz, whereas a coil antenna is preferably suitable for operation in a high frequency range, in particular at 13.56 MHz. The non-conductive portion of the product carrier may, for example, be a plastics material film or a lacquer coating on a metallic carrier layer. However, an embodiment is preferred in which the antenna is arranged on a non-conductive material, below which no electrically conductive material is located. In the case of a blister packaging, it is conceivable to cover the base part with its cavities only in the region of the cavities with a cover film having at least one metal foil and to arrange the antenna, in particular the coil antenna in the region of the base part, preferably consisting exclusively of plastics material and/or paper or a portion of the cover film consisting exclusively of plastics material and/or paper.

An embodiment is particularly advantageous, in which the electric power, which can be introduced without contact, may be introduced by means of the antenna cooperating with the electronic means to transmit the value correlating with the degree of filling, so no separate power receiver antenna has to be provided, although an embodiment of this type is also within the scope of the invention.

An embodiment is particularly advantageous, in which the electronic means are configured in such a way that they are configured to determine the value correlating with the degree of filling of the product carrier on the basis of the electrical resistance, in particular on the basis of the total electrical resistance of the circuit, wherein the total resistance correlating with the number of opened and/or closed switches, in the resistances connected in parallel is calculated as $$\frac{1}{R_{total}} = \frac{1}{R_1} + \frac{1}{R_2} + \ldots + \frac{1}{R_n}$$

wherein $R_{total}$ designates the total resistance of the circuit and $R_1$ to $R_n$ designate the electrical resistances of the switches or the electrical resistances associated with the switches. In this case, it is within the scope that the value correlating with the degree of filling is either only calculated on the basis of the total resistance, or that the value corresponds to this total resistance. Alternatively, the value correlating with the degree of filling is determined on the basis of the measured electric current which flows through the circuit, or the value corresponds to the current intensity. The total resistance is preferably determined by a current measurement and a simultaneous voltage measurement. For the correct measurement of the current or the resistance in the electronic means, a voltage stabiliser and/or a current stabiliser is to stabilise the voltage or the current, as the power introduced without contact is not the same size in each repetition.

With regard to the parallel connection of the at least two switches, there are different possibilities. According to a first, preferred, alternative two main lines (phase line and zero line) are provided, which are connected to one another by means of the switches, the electronic means either being connectable or already connected to the two main circuit board conductors. In this case, the switches are preferably formed, in each case, by a connecting line connecting the main circuit board conductors to one another.

Alternatively, it is conceivable to provide only a main line (phase line), which supplies the individual switches (connecting lines) with current, the connecting lines leading from one main line preferably to a metallic face, in particular a metal foil of the product carrier, which is then the earth for the circuit. Depending on the configuration of the electronic means, these may also be connected to the metallic face, in particular the metallic film, or may not be connected.

In a development of the invention, it is advantageously provided that at least a main line is formed by an electrically conductive foil of the product carrier. If two main lines are provided, an embodiment is advantageous in which one of the main lines, in particular the phase line, is not directly formed by an electrically conductive foil of the product carrier, but by a circuit board conductor provided on an electrically insulating layer/foil, in particular imprinted. If, when proceeding from two main circuit board conductors, the two main circuit board conductors are to be formed in portions by an electric foil of the product carrier, it is necessary to insulate these two foils from one another electrically.

As already explained above, an embodiment is advantageous in which when two main lines are provided, the switches are formed by parallel connecting lines connecting the main lines to one another, which are interrupted when opening the packaging, whereby the total resistance of the circuit changes, which can in turn be evaluated, i.e. measured by means of the electronic means, in particular by evaluation means of the electronic means.

Likewise, even in the event that only one main line is provided the switches are preferably formed by connecting lines connected to the main line and arranged parallel to one another, wherein the connecting lines electrically conductively connect the main line and an electrically conductive region, in particular a metal foil of the product carrier, to one another and are interrupted as soon as a packaging unit is opened.

The configuration of the switches as circuit board conductors has the advantage that these cannot be closed again so these are one-way switches.

As mentioned, by opening at least one switch, the total resistance of the circuit changes. To increase the measuring precision or the determining precision of the number of opened and/or closed switches, an embodiment is advantageous in which a resistor is associated in each case with the switches, wherein the resistances associated with the individual switches, which may also be formed by the switches themselves, are preferably at least approximately of the same size, which can be achieved by the same choice of material and/or the same line cross-section and/or the same length.

It is within the scope of the invention that the first electrical resistor which is associated with the first switch, in other words preferably the first connecting line, is connected thereto or is formed by this connecting line. The same applies additionally or alternatively to the remaining resistors of the circuit. A high resistance of a connecting line may, for example, be achieved by a small line cross-section and/or by the selection of a corresponding connecting line material and/or by a large line length.

An embodiment is preferred in which the at least one, preferably both, main lines have a higher conductivity than the connecting lines. This can be achieved, for example, in that the at least one main line is formed from a different material to the connecting lines and/or in that the at least one main line has a larger line cross-section than the connecting lines.

This can be realised, for example, in that the main lines are silver-containing, in particular are formed from a silver-containing paint or a silver-containing lacquer and/or the connecting lines are graphite-containing, for example made of a graphite-containing lacquer or a graphite-containing paint.

It is preferred if the electronic means are configured as a microchip, which is either already rigidly arranged on the product carrier or can be fixed to the product carrier, so it can cooperate with the circuit. It is within the scope of the invention that only one part of the electronic means is configured as a microchip, which cooperates with separate electronic components.

An embodiment is preferred in which the microchip is configured as an RFID microchip (radio frequency identification) or at least comprises an RFID unit. The antenna for transmitting the value correlating with the degree of filling of the product carrier is preferably formed separately from the microchip. However, it is within the scope of the invention to configure the antenna as part of the microchip.

In order to obtain a constant voltage and/or a constant current to measure the resistance or the current intensity and optionally also the voltage from the power introduced without contact, an embodiment is advantageous in which the electronic means comprise a voltage stabiliser and/or a current stabiliser. An embodiment is preferred in which the electronic unit comprises a voltage divider, the circuit preferably being a part of the voltage divider and the circuit being connected by means of the, in particular, two-pole voltage divider, to the microchip configured, in particular, as an RFID chip. In order to be able to electronically evaluate the current flowing through the circuit, or resistance, the electronic means preferably comprise an analogue-to-digital converter.

Depending on the configuration of the antenna and/or of the electronic means, the electric power may be introduced inductively and/or capacitively and/or by means of electromagnetic radiation without contact.

An embodiment is particularly advantageous, in which an identifier associated with the product carrier is stored in a memory of the electric means, in particular in a memory of the RFID microchip and can be transmitted together with the value correlating with the degree of filling by means of the antenna, so a specific product carrier can be associated with the value correlating with the degree of filling.

In a development of the invention, it is advantageously provided that the product carrier is configured as a blister packaging, in particular for the medical sector. The blister packaging preferably comprises a base part with a plurality of cavities, at least one cavity being part of a packaging unit in each case, which is sealed with a cover film which can be pressed through and is arranged on the base part. The circuit is preferably arranged on this cover film or inside this cover film, in particular imprinted, etc.

There are the most varied possibilities for forming the cover film. An embodiment is preferred in which a cover film is provided below the circuit with an electrically insulating layer, for example a plastics material film, or paper or an electrically insulating lacquer, onto which the at least one main line and the connecting lines, i.e. the switches are applied, optionally with additional resistors. The cover film may be formed from paper, plastics material or from a metal foil or be formed as a composite material at least partially of these materials. A composite cover film of this type may have a plurality of layers, for example two or more plastics material layers, from case to case with a barrier layer in between. Additionally or as an alternative, it is conceivable to metalise the plastics material layers, or to arrange a metal foil between two plastics material layers or a plastics material film between two metal foils. Likewise, the cover film may be formed as a metal foil lacquered on one or both sides, the lacquer used preferably being electrically insulating. The metalising layers for coating plastics material films and/or paper films may be formed from gold, silver, iron, steel, copper, tin, aluminium or alloys of these metals. Likewise, the metal foils being used may be formed from gold, silver, iron, steel, copper, tin, aluminium or alloys, in particular aluminium alloys.

Metallised plastics materials are preferably used, in particular metallised plastics material films, on which the metal is applied by a chemical and/or physical deposition method. In particular, the so-called electroplating of plastics can be used as the chemical method. Likewise, metallic solutions may be applied or sprayed on, in particular by cathode sputtering. Sputtering or vacuum deposition are to be mentioned by way of example for a physical deposition. If the metal layer is sputtered on or deposited in a thin vacuum layer method, the deposited or vapour-deposited metals may be, in particular gold, silver, copper, iron, nickel, zinc, tin, aluminium, alloys or mixtures of these metals. Preferably, the metallic layers on plastics material films have a thickness of between 2 and 200 nm.

Additionally or alternatively, papers, in particular coated papers, semi-cardboard, cardboard or paperboard or plastics material may be used as materials for cover films. Coated papers may be coated with waxes, hot melt or plastics materials. Plastics materials which can be used, in particular, for coating or for forming a plastics material foil are, in particular, polyvinylchloride, polyolefins, polyethylene or polypropylene, polycarbonates, polyamides, polyesters, polyacrylonitriles, polystyrenes or the copolymers or graft polymers thereof etc. The films being used may be formed as composites, laminates or layer materials of two or more plastics material layers, which are formed, for example, by lamination or extrusion. Possible composites being used can be connected to one another by means of primers, by means of primers and adhesive, or by means of adhesives, by lamination. In another manner, the plastics material can be extrusion-laminated as a layer onto the metal foil. The circuit is preferably printed, at least partially, onto the cover film, chemically applied wet or vapour deposited or a whole-area conductor layer on an insulating layer is removed, for example by evaporation or etching to such an extent that the required circuit board conductor structure or circuit board conductor portions of the circuit, in particular with the portion-wise action of a circuit resistor, remain.

An embodiment is particularly preferred, in which hard-rolled aluminium foils are used as a carrier foil for the cover film. In this case, the carrier foil is preferably provided in a planar manner with an insulating layer, for example with a cover lacquer layer. The various circuit board conductors and/or connection contact faces for the electronic means and/or for the antennas can be printed on the cover lacquer layer, for example by the gravure printing method, in one or more layers with an electrically conductive paint (material), preferably a silver conductive paint and/or an organic conductive paint. From case to case, the connection lines (switch+resistor) can be imprinted with a further conductive paint, such as a silver and/or graphite paint. Advantageously, the resistor faces of the connecting lines, which consist, for example, of graphite conducting paint and are fed by input and output lines (main lines) preferably consisting of silver, are imprinted by the gravure printing method. The required loss line of the resistors can be achieved by a relatively large-area configuration of the imprinted resistor faces. In addition or alternatively, it is conceivable to form the resistors which are associated with the switches or the connecting lines by a course of the connecting lines which meanders at least in portions.

An advantageous embodiment provides that the at least one main line, preferably in the case of two main lines both main lines, and all the connecting lines be configured from an identical material (paint) and the resistances of the at least one main line be kept low by the selection of a large line cross-section and that comparatively high switch resistances be produced by connecting lines with a small line cross-section.

An embodiment is preferred in which the antenna is already rigidly connected (at the factory) to the product carrier configured as a blister packaging. The antenna is preferably arranged, in this case, on the cover film and/or the base part. In particular if an antenna configured as a slot antenna is used, the latter is advantageously introduced into a cover film having at least one carrier layer made of metal, in particular of aluminium or an aluminum alloy, in particular scored in. Slot antennas are suitable for the ultra high frequency range, in particular for the range of about 886 MHz. Alternatively, it is conceivable to configure the antenna as a coil antenna, for the high frequency range, preferably for the range of about 13.56 MHz. Particularly good transmission results were achieved when this type of antenna is not applied directly to a metal foil, but that an adequately large spacing is provided either between the coil antenna and a metal foil of the cover film, in particular by the provision of a correspondingly thick plastics material film, a correspondingly thick insulation coating and/or a correspondingly thick insulating lacquer, or that the antenna configured as a coil antenna is applied in a cover film region, which consists exclusively of a non-conductive material. In addition or as an alternative, an antenna configured in this manner may be provided on the base part, in particular imprinted, the base part preferably being produced from non-conductive plastics material, for example by deep drawing.

An embodiment of the product carrier is preferred in which the latter is already equipped, i.e. filled with at least one product, in particular at least one medicine, preferably configured as a pill, coated tablet and/or ampoule, the individual medicines being received here in the different packaging units, in other words, in a blister, in the cavities, which are sealed by the cover film.

The subject of the invention is also a system made up of an aforementioned data carrier with or without electronic units and/or an antenna already fixed thereto, and a receiver unit having a receiver antenna for receiving the value correlating with the degree of filling of the product carrier.

The electronic means of the product carrier and the receiver unit are preferably configured in such a way that they can communicate with one another in the NFC protocol.

In a development of the invention, it is advantageously provided that the receiver unit is configured in such a way that it is configured for the introduction without contact of power for the electronic unit and the circuit of the product carrier. An embodiment is preferred in which the receiver antenna of the receiver unit is configured to receive the value correlating with the degree of filling of the product carrier and simultaneously for transmitting or outputting electric power.

It is of particular advantage if the receiver unit is configured to store the value correlating with the degree of filling of the product carrier and/or passing it, in particular sending it on (by radio or cable), to a database. In addition to the value, a confirmation to be requested from the user of the proper use of a product removed from a packaging unit of the product carrier, in particular medication, and/or the non-confirmation is preferably passed on to the database. In addition to the value correlating with the degree of filling or the confirmation/non confirmation of the proper use, it is advantageous if the receiver unit stores a received identifier of the product packaging and/or passes it to the database. In addition it is advantageous if, at the same time, the time of receiving the value correlating with the degree of filling and/or the time of receiving the identifier of the product packaging and/or the time of confirmation are stored and/or passed to a database.

It is particularly advantageous if the receiver unit, which preferably simultaneously has power supply means for the product carrier, is integrated in a mobile telephone or is formed by a mobile telephone.

The removal history may, for example, be stored in the receiver unit, preferably the mobile telephone with the time information and/or the identifier of the product carrier and displayed. By transmitting at least parts of this data to a database, every removal and preferably intake which has taken place worldwide can always be clearly assigned. In order to be able to check the intake, it is advantageous if software of the receiver unit, preferably of the mobile telephone, requests the user to confirm each removal. If a confirmation of this type does not take place after a previously established deadline, corresponding measures, such as reminding the user and/or in particular subsequently the alerting of a call centre or the activation of other auxiliary measures may optionally be initiated. The information which can be inferred with the removal unit and optionally passed on can in addition be used for marketing actions, in particular for pharmaceutical producers, insurances and/or pharmacists as well as for a reimbursement system for proven conscientious taking of expensive medicines, the long term taking of which is of particular importance for success.

Figure 2:
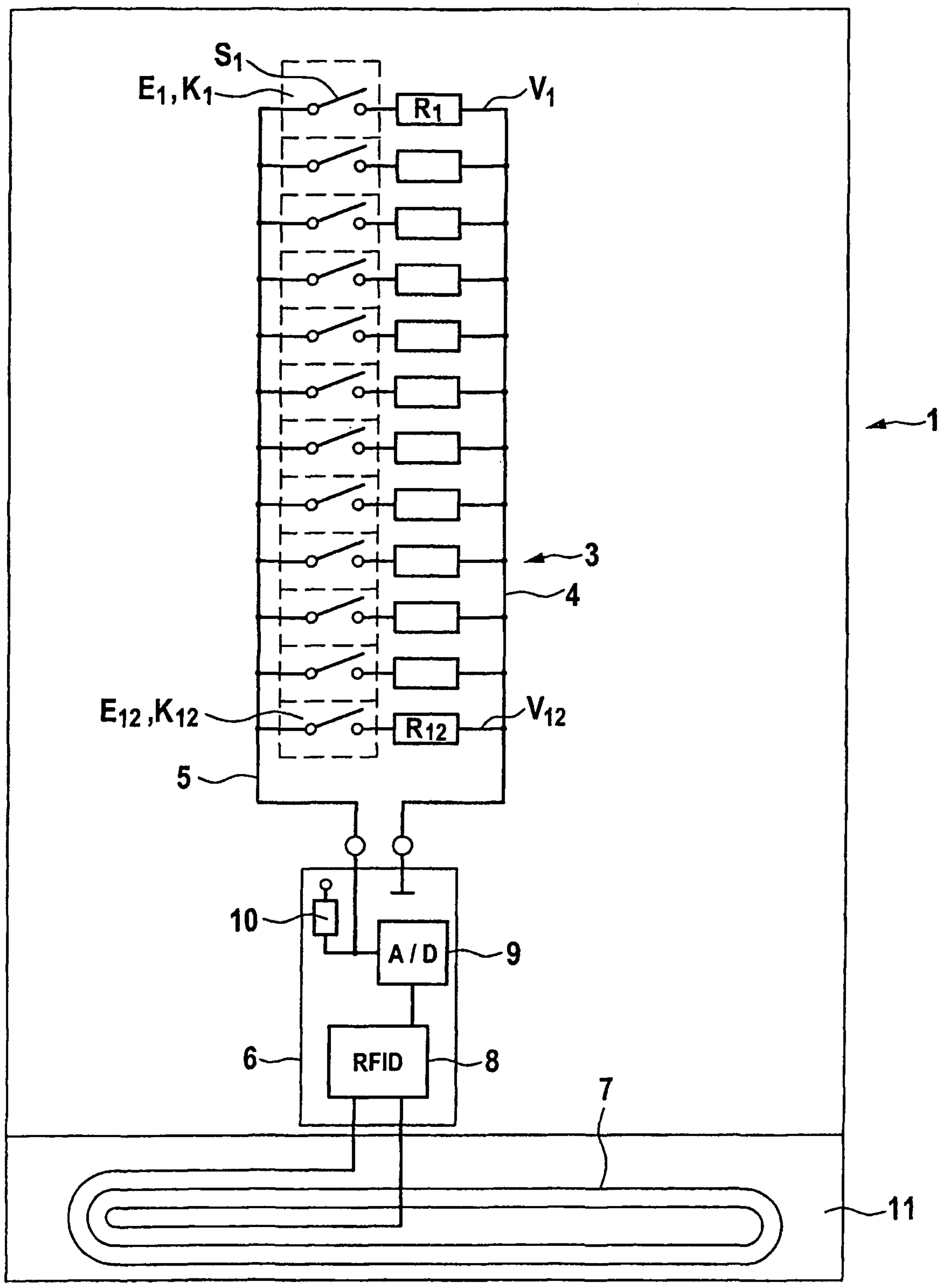
Figure 3:
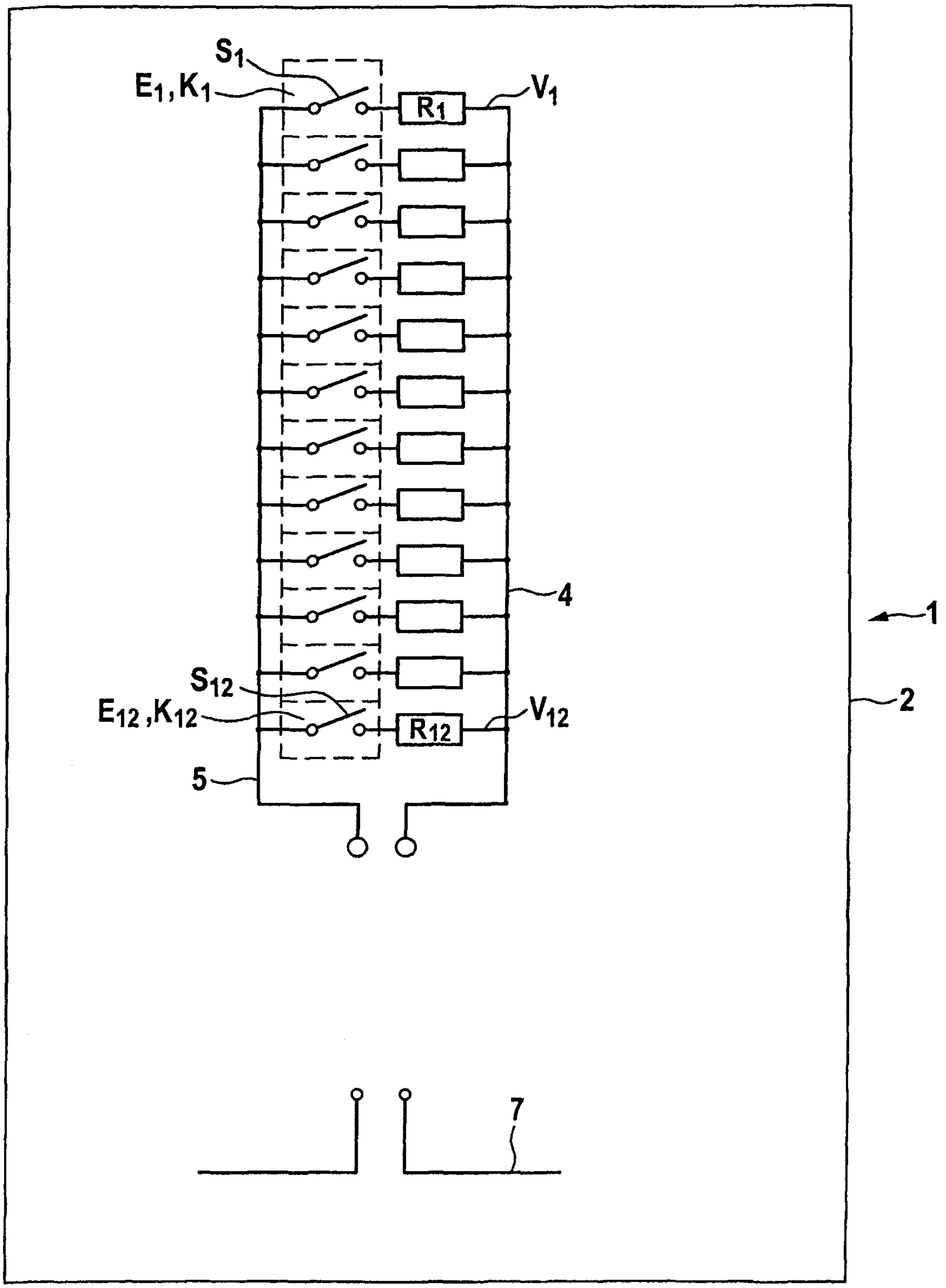
Figure 4:
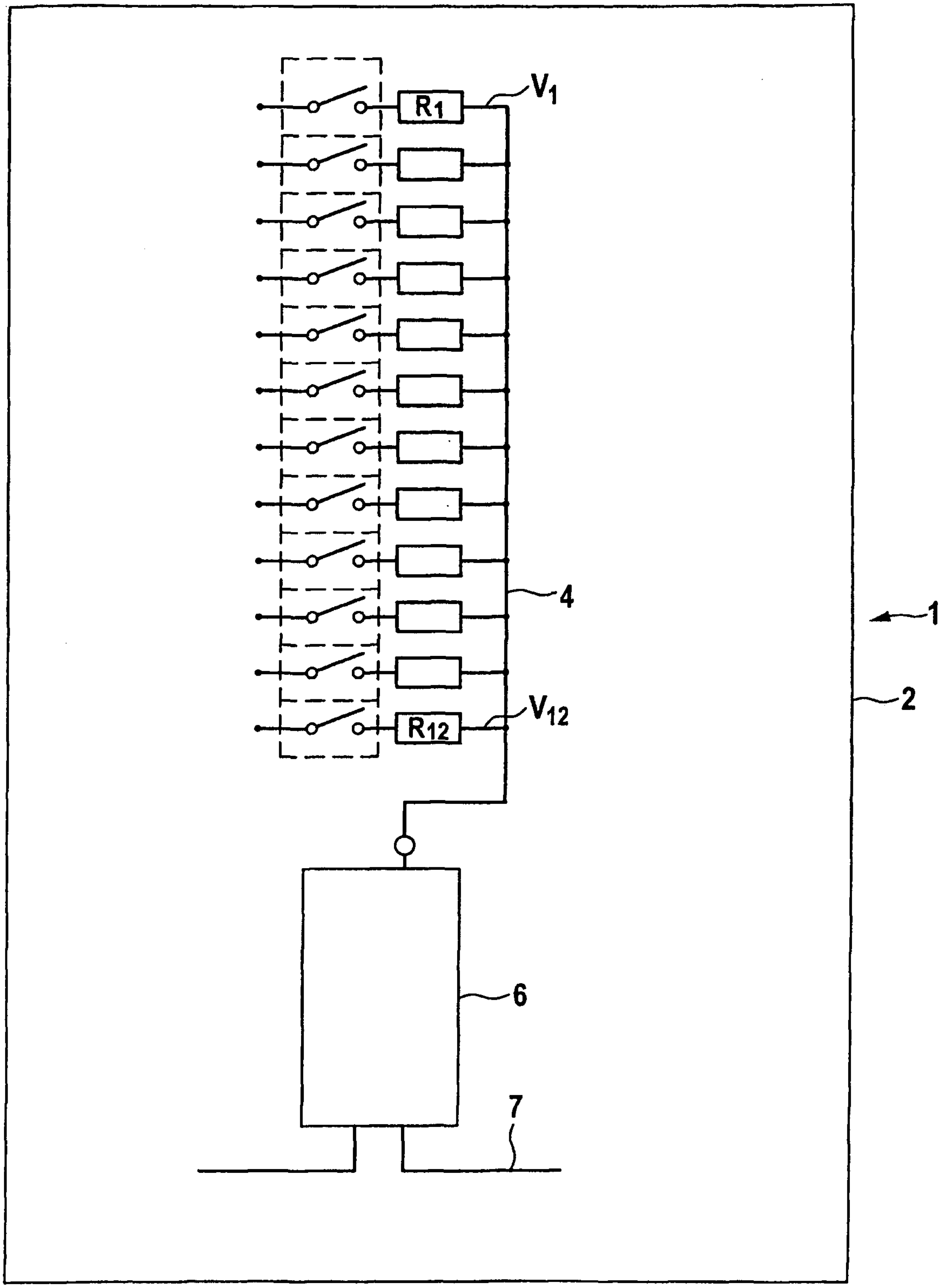

Embodiments of the invention will now be described below with the aid of the drawings, in comparison to the prior art, which is partly also shown. These are not necessarily to show the embodiments to scale, rather the drawings, where they are useful for explanation, are implemented in a schematic and/or slightly distorted form. With regard to supplements to the teachings which can be directly recognised from the drawings, reference is made to the relevant prior art. It should be taken into account here that diverse modifications and changes relating to the form and the detail of an embodiment may be undertaken without deviating from the general idea of the invention. The features of the invention disclosed in the description, in the drawings and in the claims may be important both individually and in any combination for the development of the invention. In addition, all combinations of at least two features disclosed in the description, the drawings and/or the claims, fall within the scope of the invention. The general idea of the invention is not limited to the exact form or the detail of the preferred embodiment shown and described below or limited to a subject which would be restricted in comparison to the subject claimed in the claims. In the case of dimension ranges disclosed, values lying within the limits mentioned are also to be disclosed as limit values and can be used and claimed as desired. In the drawings:

FIG. 1 shows a first embodiment of a product carrier configured as a blister packaging with a slot antenna, FIG. 2 shows a second embodiment of a product carrier configured as a blister packaging with a coil antenna, FIG. 3 shows an embodiment of a product carrier configured as a blister packaging without electronic means, the product carrier being configured to cooperate with electronic means and FIG. 4 shows an embodiment of a product carrier configured as a blister packaging, in which the switches are only connected by a main line to the electronic means.

The same components and components with the same function are designated in the figures by the same reference numerals.

FIG. 1 shows a product carrier 1 configured as a blister packaging in a plan view of a cover film 2 of the product carrier 1. Located below the cover film is a base part, not shown, made of plastics material with a large number of cavities $K_1$ to $K_{12}$ indicated by dashed lines, which are sealed by the cover film 2. The cover film 2, in this embodiment, consists of a carrier foil made of an aluminium alloy, which is covered by an insulating lacquer layer. An integrated circuit 3 is printed on the cover film 2, more precisely on the lacquer layer of the cover film 2 of the product carrier 1, the circuit 2 being connected by a first and a second main line 4, 5 to electronic means 6, the electronic means 6 in turn being connected by means of two connections to an antenna configured as a two-pole slot antenna, which is scored into the carrier foil of the cover film 2.

The two main lines 4, 5 extend along the longitudinal extent of the product carrier 1. The two main lines 4, 5 are connected to one another by means of twelve connecting lines V1 to V12, which are connected in parallel, the connecting lines $V_1$ to $V_{12}$ and the two main lines 4, 5 in this embodiment being configured from an identical graphite-containing material and differing only by the line cross-section, the line cross-section of the main line 4, 5 being larger than that of the connecting lines $V_1$ to $V_{12}$.

Each connecting line $V_1$ to $V_{12}$ extends in a portion above one of these associated cavities $K_1$ to $K_{12}$. In this region, each connecting line $V_1$ to $V_{12}$ in each case forms a switch $S_1$ to $S_{12}$ shown symbolically in each case. At the same time, each connecting line $V_1$ to $V_{12}$ in each case forms a resistance $R_1$ to $R_{12}$. This at least approximately produces a total resistance $R_{total}$ of $$\frac{1}{R_{total}} = \frac{1}{R_1} + \frac{1}{R_2} + \ldots + \frac{1}{R_n}$$

The cover film, together with a respective cavity $K_1$ to $K_{12}$, forms a packaging unit $E_1$ to $E_{12}$. The products received in the packaging units $E_1$ to $E_{12}$, in this case tablet-form medicines, are removed, in that the base part in the region of those cavities $K_1$ to $K_{12}$, from which the product is to be removed, is pressed in the direction of the cover film 2, so the cover film 2 of the product is broken through and the associated connecting line $V_1$ to $V_{12}$ is interrupted and therefore the switch $S_1$ to $S_{it}$ formed thereby is opened, so the total resistance $R_{total}$ of the circuit 3 is changed. The electronic means 6 determine this, for example by measuring the intensity of the current at constant voltage and sends a value correlating with the degree of filling of the product carrier 1, in particular the current intensity or the total resistance or a number or quantity emerging therefrom of removed or still available products by means of the antenna 7 to a suitable receiver unit, not shown. Together with the transmission of the value, an identifier of the product carrier is advantageously transmitted.

The electric power which is required to provide the circuit 3 with current and is required for the mode of functioning of the electronic means of 6, is introduced by an external power source associated, in particular, with the receiver unit, without contact into the antenna 7.

The electronic means 6 which is configured as a microchip comprise an RFID microchip 8 and an analogue-to-digital converter 9 with a suitable resolution. The imprinted circuit 3 integrated into the product carrier 1 is part of a voltage divider 10, which is connected to the analogue-to-digital converter 9, and this is connected in turn to the RFID microchip 8, the RFID microchip 8 being connected to the antenna 7. A constant working point (constant voltage) is obtained by means of the voltage divider 10 in order to be able to infer the number of opened and/or closed packaging units $V_1$ to $V_{12}$ by measuring the current intensity. The electronic means 6 furthermore comprise a rectifier, not shown.

As an alternative to the circuit arrangement shown, it is also conceivable for connecting lines to branch off on both sides of the main line 4, which are guided to the second main line 5 or to a further main line, not shown, which is then also guided again with the electronic means.

FIG. 2 shows a further embodiment of a product carrier 1 configured as a blister packaging, substantially only the differences with respect to the embodiment according to FIG. 1 being dealt with below to avoid repetitions. With regard to the features in common, reference is made to the previous figure description and to FIG. 1. A difference from the embodiment according to FIG. 1 is that the antenna 6 is not configured as a slot antenna, but as a coil antenna and is located on a cover film portion 11, which is made of plastics material. The component which is designated by the reference numeral 11, apart from a cover film portion, for example made of plastics material, may be formed from a portion of the base part of the product carrier 1 which is not covered by the cover film 2. The antenna 6 configured as a coil antenna according to FIG. 2 is preferably printed or glued onto the portion designated by the reference numeral 11.

In contrast to the embodiment according to FIG. 1, the main lines 4, 5 are made from a different material to the connecting lines $V_1$ to $V_{12}$. For example, the main lines 4, 5 consist of a silver-containing material, whereas the connecting lines $V_1$ to $V_{12}$ consist of a graphite-containing material with a lower conductivity to thus form the resistors $R_1$ to $R_{12}$. The connecting lines and the main lines are preferably applied, to obtain good contact points, wet-in-wet, for example by the gravure printing method. The electric power to operate the electronic means 6 and the circuit 3 may, for example, be introduced by means of electromagnetic radiation (electromagnetically) into the electronic means 6.

FIG. 3 shows an embodiment of the product carrier 1, in which electronic means 6 are not provided on the product carrier 1 from the start, i.e. from the factory, but in which the electronic means have to be fastened, for example by gluing or latching, onto the product carrier 1 by the end user. In this case, the electronic means 6 shown in FIGS. 1 and 2 may be used, for example. Only a reliable contacting of the main lines 4, 5 and the antenna 7 have to be ensured, in particular by a suitable configuration of the contact points. Except for the fact that the electronic means 6 are not yet fixed to the product carrier in FIG. 3, the embodiment according to FIG. 3 corresponds to the embodiment according to FIG. 1, so to avoid repetitions with regard to further comments, reference is made to the description of the embodiment according to FIG. 1.

FIG. 4 shows a further embodiment of a product carrier 1 configured as a blister packaging. It is possible to see the merely schematically indicated electronic means 6 to evaluate the total resistance or the current and to transmit the value correlating to the degree of filling of the product carrier 1 by means of the antenna 7.

It can be seen that issuing from the electronic means 6 there is only an imprinted or glued-on main line 4, from which, as in the other embodiments, the main lines $V_1$ to $V_{12}$ which form the resistances $R_1$ to $R_{12}$, branch off. In contrast to the embodiments described above, the connecting lines $V_1$ to $V_{12}$ are, however, not connected to an imprinted or glued-on second main line, but to an electrically conductive foil of the cover film 2. Depending on the configuration of the electronic means 6, the latter may either be connected to this electrically conductive foil, or not.

The invention claimed is:

1. Product carrier comprising a first packaging unit wherein when opened a first switch of an integrated circuit of the product carrier is opened and at least one second packaging unit wherein when opened a second switch of the integrated circuit is opened, wherein the integrated circuit is configured to cooperate with electronic means so that a value correlating with the degree of filling of the product carrier is determined on the basis of the number of closed or opened switches, wherein an antenna cooperates with the electronic means to transmit said value, wherein the electric power for the electronic means may be introduced without contact, wherein the first and the second switch are connected in parallel.

2. Product carrier according to claim 1, wherein the switches are connected to the electronic means so that a value correlating with the degree of filling of the product carrier is determined on the basis of the number of closed or opened switches, wherein the power for the electronic means can be introduced without contact.

3. Product carrier according to claim 1, wherein the product carrier has an antenna associated with the electronic means for transmitting the value correlating to the degree of filling of the product carrier.

4. Product carrier according to claim 3, wherein the antenna is configured as a slot antenna slotted into a metal foil of the product carrier, or as a coil antenna arranged on a nonelectrically conductive area of the product carrier.

5. Product carrier according to claim 1, wherein the electrical power for the electronic means may be introduced by way of the antenna without contact.

6. Product carrier according to claim 1, wherein the electronic means are configured to determine the value correlating with the degree of filling on the basis of the electrical resistance, which can be varied by opening at least one of the switches, of the integrated circuit.

7. Product carrier according to claim 1, wherein the first and the second switch are electrically conductively connected by means of at least one circuit board conductors, to the electronic means.

8. Product carrier according to claim 7, wherein at least one of the circuit board conductors is formed, at least in portions, by an electrically conductive foil of the product carrier.

9. Product carrier according to claim 8, wherein the first switch is formed by a first connecting line electrically connecting the circuit board conductors to one another and is interrupted by opening the first packaging unit and wherein the second switch is formed by a second connecting line electrically connecting the circuit board conductors to one another and is interrupted by opening the second packaging unit.

10. Product carrier according to claim 8, wherein the first switch is formed by a first connecting line electrically connecting the circuit board conductors to an electrically conductive foil of the product carrier and is interrupted by opening the first packaging unit and wherein the second switch is formed by a second connecting line electrically connecting the circuit board conductors to an electric foil of the product carrier and is interrupted by opening the second packaging unit.

11. Product carrier according to claim 1, wherein a first resistor is associated with the first switch and a second resistor is associated with the second switch.

12. Product carrier according to claim 11, wherein the first resistor is formed by the first connecting line and is connected to the first connecting line and the second resistor is formed by the second connecting line and is connected thereto.

13. Product carrier according to claim 12, wherein at least one of the circuit board conductors has a higher conductivity than at least one of the connecting lines and in that at least one of the main lines is formed from a different material to at least one of the connecting lines and in that at least one of the main lines has a larger line cross-section than at least one of the connecting lines.

14. Product carrier according to claim 9, wherein at least one of the circuit board conductors or at least one of the connecting lines is graphite-containing or silver-containing or polymer containing.

15. Product carrier according to claim 1, wherein the electronic means comprise a microchip.

16. Product carrier according to claim 15, wherein the microchip includes an RFID unit.

17. Product carrier according to claim 1, wherein the electronic means, comprise an analogue-to-digital converter or a voltage divider or a voltage stabilizer for obtaining a constant voltage or a current stabilizer for obtaining a constant current, or a rectifier.

18. Product carrier according to claim 1, wherein the electrical power may be introduced inductively or capacitively or by means of electromagnetic radiation.

19. Product carrier according to claim 1, wherein an identifier associated with the product carrier is stored in a memory of the electronic means and can be transmitted together with the value correlating with the degree of filling by means of the antenna.

20. Product carrier according to claim 1, wherein the product carrier is configured as a blister packaging.

21. Product carrier according to claim 20, wherein the blister packaging has a base part with a first cavity and a second cavity, the first cavity being a component of the first packaging unit and the second cavity being a component of the second packaging unit and in that a cover film sealing the cavities is arranged on the base part.

22. Product carrier according to claim 21, wherein the cover film is made of paper or plastics material or metal or as a composite material film.

23. Product carrier according to claim 21, wherein the electronic means or the integrated circuit or at least one of the switches or at least one of the resistors are provided on the cover film.

24. Product carrier according to claim 21 wherein the cover film has a metallic carrier film, coated with an insulating layer, or an insulating lacquer, at least in portions, and in that at least one of the circuit board conductors or at least one of the connecting circuit board conductors or at least one of the resistors or at least one of the switches, is printed, on the insulating layer, or glued on, or sprayed on at least one electrically conductive material.

25. Product carrier according to claim 21, wherein the cover film comprises an electrically non-conductive film, or is configured as such, having at least one of the circuit board conductors or at least one of the connecting circuit board conductors or at least one of the resistors or at least one of the switches is printed thereon, or glued on, or sprayed on.

26. Product carrier according to claim 1, wherein the antenna is arranged in or on the cover film or wherein the antenna is arranged on the base part.

27. Product carrier according to claim 1, wherein at least one respective product is received in the packaging unit.

28. System of a product carrier according to claim 1, comprising a receiver unit having a receiver antenna for receiving the value correlating with the degree of filling of the product carrier.

29. System according to claim 28, wherein the electronic means are configured to communicate with the receiver unit of the product carrier in the NFC protocol (RFID system).

30. System according to claim 28, wherein power supply means for the introduction of power without contact are associated with the receiver unit.

31. System according to claim 28, wherein the receiver unit is configured to store or pass on to a database a value transmitted by means of the antenna of the product carrier and correlating with the degree of filling of the product carrier or a confirmation of the proper use of a product taken from a packaging unit of the product carrier or an identifier of the product carrier or time information characterizing the receiving time of the value or the identifier or the confirmation time.

32. System according to claim 28, wherein the receiver unit is integrated into a mobile telephone or a personal computer.

* * * * *